United States Patent
Masser et al.

(10) Patent No.: US 9,558,087 B2
(45) Date of Patent: Jan. 31, 2017

(54) TEST VIRTUAL VOLUMES FOR TEST ENVIRONMENTS

(71) Applicant: International Business Machines Corporation, Armonk, NY (US)

(72) Inventors: Joel L. Masser, San Jose, CA (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 14/312,459

(22) Filed: Jun. 23, 2014

(65) Prior Publication Data
US 2015/0370671 A1    Dec. 24, 2015

(51) Int. Cl.
| G06F 12/00 | (2006.01) |
| G06F 11/22 | (2006.01) |
| G06F 11/263 | (2006.01) |

(52) U.S. Cl.
CPC ......... *G06F 11/2221* (2013.01); *G06F 11/263* (2013.01)

(58) Field of Classification Search
USPC .......................................................... 714/27
See application file for complete search history.

(56) References Cited

U.S. PATENT DOCUMENTS

| 5,995,426 | A | * | 11/1999 | Cowles | G11C 29/50012 365/201 |
| 7,552,044 | B2 | | 6/2009 | Xu et al. | |
| 2007/0250302 | A1 | * | 10/2007 | Xu | G06F 11/261 703/20 |
| 2009/0300426 | A1 | * | 12/2009 | Eccles | G06F 11/2221 714/42 |
| 2011/0167302 | A1 | * | 7/2011 | McCune | G06F 11/0775 714/37 |
| 2011/0197022 | A1 | * | 8/2011 | Green | G06F 3/0607 711/112 |
| 2011/0282846 | A1 | * | 11/2011 | Shepard | G06F 11/0727 707/687 |
| 2012/0079194 | A1 | * | 3/2012 | Lim | G11B 19/048 711/114 |
| 2013/0111260 | A1 | * | 5/2013 | Reddy | G06F 11/2041 714/4.11 |
| 2014/0245026 | A1 | * | 8/2014 | Bates | G06F 3/065 713/190 |

* cited by examiner

*Primary Examiner* — Kamini Patel
(74) *Attorney, Agent, or Firm* — Kunzler Law Group (57) ABSTRACT

For test virtual volume operation testing, an identification module determines if an input/output (I/O) operation for a test virtual volume is directed to volume contents data. A disposition module executes the I/O operation in response to the I/O operation being directed to the volume contents data and declines the I/O operation in response to the I/O operation not being directed to the volume contents data.

11 Claims, 7 Drawing Sheets

TEST VIRTUAL VOLUMES FOR TEST ENVIRONMENTS

FIELD

The subject matter disclosed herein relates to test virtual volumes and more particularly relates to test virtual volumes for test environments.

BACKGROUND

There is often a need to test operations for storage system. Unfortunately, many test environments require the use of a large number of volumes to be adequately tested.

BRIEF SUMMARY

A method for test virtual volume operation testing is disclosed. An identification module determines if an input/output (I/O) operation for a test virtual volume is directed to volume contents data. A disposition module executes the I/O operation in response to the I/O operation being directed to the volume contents data and declines the I/O operation in response to the I/O operation not being directed to the volume contents data. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program code thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program code that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed and executed through either a remote-access or a site-to-site VPN. When using the remote-access VPNs the computer program product is deployed, accessed and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Figure 1:
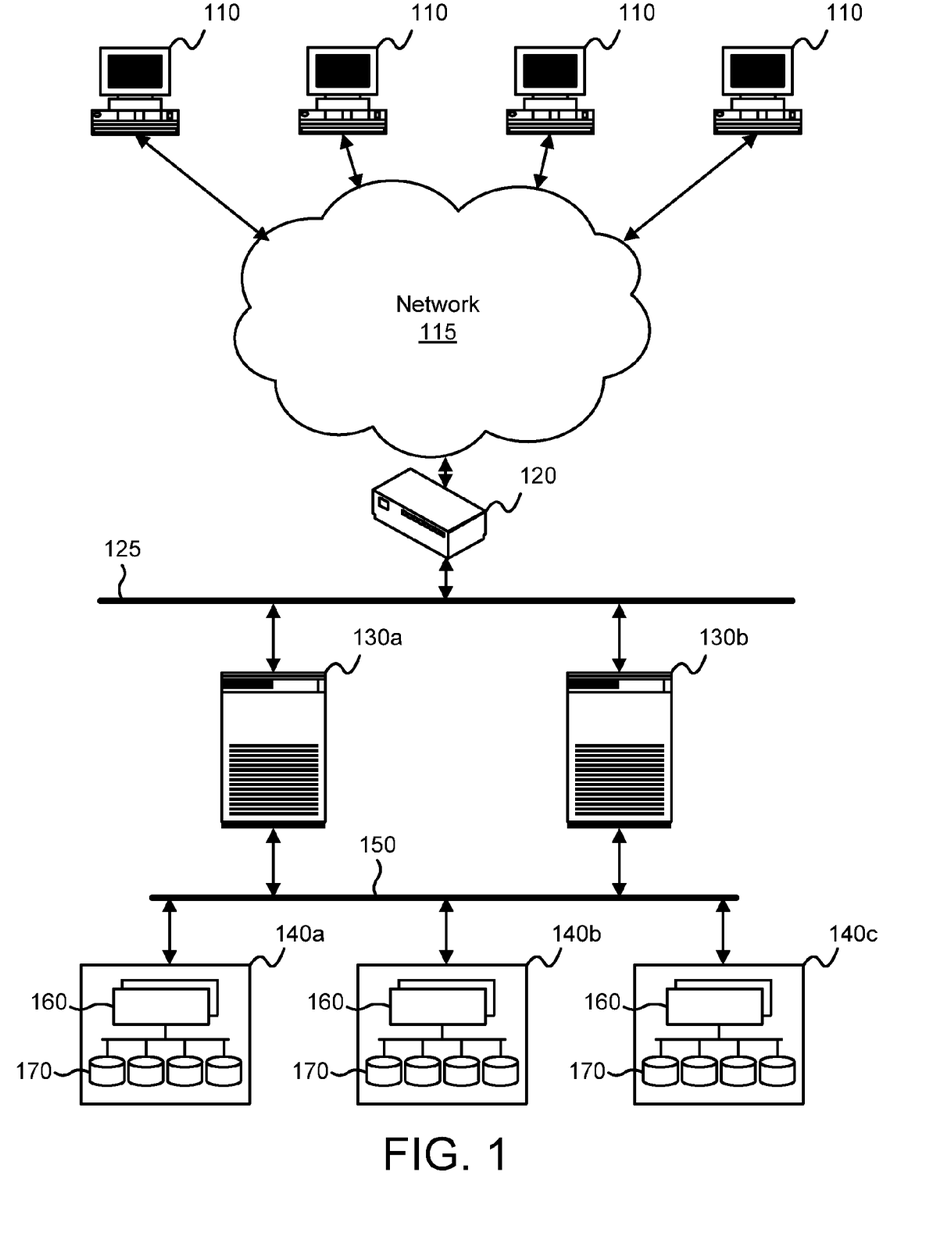
FIG. 1 is a schematic block diagram illustrating one embodiment of the storage system.

FIG. 1 is a schematic block diagram illustrating one embodiment of a storage system 100. In the depicted embodiment, the storage system 100 includes one or more client computers 110, a network 115, a router 120, an internal network 125, one or more servers 130, a storage communications channel 150, and one or more storage subsystems 140. The storage system 100 may host a test environment.

As used herein, the client computers 110 are referred to as clients 110. The servers 130 may also be configured as mainframe computers, blade centers comprising multiple blade servers, and the like. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the storage system 100 could include other data processing devices such as bridges, scanners, printers, and the like.

The network 115 connecting the clients 110 and the servers 130 may be a local area network (LAN), a wide area network (WAN), the Internet, an Ethernet network, a token ring network, or combinations thereof. The network 115 may comprise one or more nodes that may provide one or more physical and/or logical paths for transferring the data. The internal network 125 and the storage communications channel 150 may be for example a LAN, a WAN, or the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices. Alternatively, the storage device 170 may also be configured as a just a bunch of disks (JBOD), a redundant array of independent disks (RAID), a tape library, a tape backup, a tape library, a compact disk read only memory (CD ROM) library, and the like.

The storage devices 170 may be organized as volumes. For example, portions of one or more storage devices 170 may be organized as a first volume. The storage system 100 may store a plurality of volumes. A volume that stores data on the storage devices 170 is referred to herein as a production volume.

In one embodiment, the storage system 100 provides data storage services for the clients 110. For example, a client 110 may access data stored on a volume of a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the client 110.

When developing operations for the storage system 100 or when testing the storage system 100, it is useful to perform I/O operations on a large number of volumes. Unfortunately, providing production volumes of sufficient number and size to adequately test operations and/or the storage system 100 may be expensive.

The embodiments described herein support operation testing in the test environment using test virtual volumes. The embodiments may create a large number of test virtual volumes on the storage system 100. The test virtual volumes may have volume contents data but not volume data. In addition, the embodiments may determine if an I/O operation for a test virtual volume is directed to the volume contents data. The volume contents data describes the organization of data in a volume. If the I/O operation is directed to volume contents data, the embodiments execute the I/O operation. However, if the I/O operation is not directed to volume contents data, the embodiments decline the I/O operation as will be described hereafter. Because I/O operations directed to the test virtual volume are handled, operation testing may be performed with the test virtual volumes.

Figure 2A:
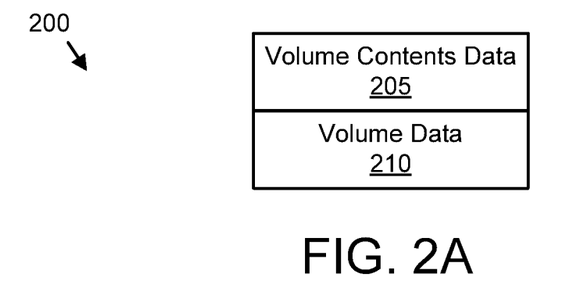
FIG. 2A is a schematic block diagram illustrating one embodiment of a production volume.

FIG. 2A is a schematic block diagram illustrating one embodiment of a production volume 200. The production volume 200 is stored on storage devices 170 of the storage system 100. The production volume 200 maybe organized as one or more data structures. The production volume 200 includes the volume contents data 205 and volume data 210. The volume data 210 is the data stored for the clients 110. The volume data 210 may include one or more data sets.

The volume contents data 205 describes the locations of the data for the clients 110 on the storage devices 170 as will be described hereafter in FIG. 2B. In one embodiment, the volume contents data includes a volume table of contents. The volume table of contents may list the data of the production volume 200 and the data locations on storage devices 170 storing the data. In addition, the volume contents data may include an index.

Figure 2B:
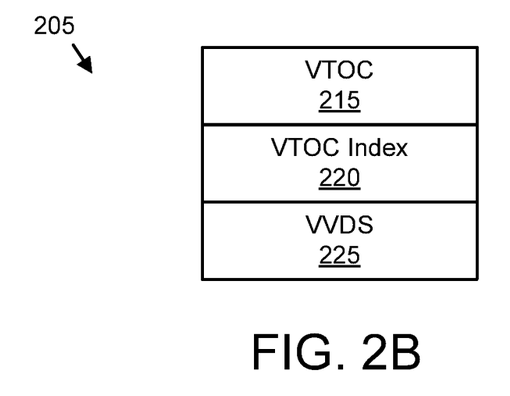
FIG. 2B is a schematic block diagram illustrating one embodiment of volume contents data.

FIG. 2B is a schematic block diagram illustrating one embodiment of the volume contents data 205. In the depicted embodiment, the volume content data 205 is for a SYSTEM Z® data processing system manufactured by International Business Machines (IBM) of Armonk, N.Y. and executing a Z/OS® operating system manufactured by IBM. The volume contents data 205 includes a volume table of contents (VTOC) 215. In addition, the volume contents data 205 may include a VTOC index 220 and a virtual storage access method (VSAM) volume data set (VVDS).

The VTOC 215 maybe organized as a data structure in a memory and/or storage device 170 that locates data in a volume. The VTOC 215 may comprise one or more data set control blocks (DSCB). The data may be organized as data sets. The VTOC 215 may list a name of each data set, a size of the data set, a location of the data set in the storage devices 170, and permissions for reading, writing, and/or deleting each data set. The DSCB may be accessed to determine the location of the data sets storing the data in the volume.

In one embodiment, the VTOC index 220 is a searchable index of the names of the data sets in the VTOC 215. The VTOC index 220 may be used to accelerate searches of the VTOC 215. The VVDS 225 may be a catalog structure used with the VSAM.

Figure 2C:
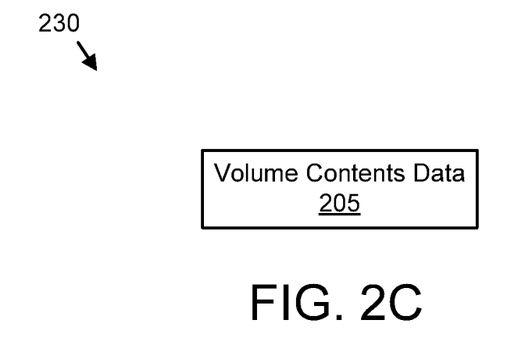
FIG. 2C is a schematic block diagram illustrating one embodiment of a test virtual volume.

FIG. 2C is a schematic block diagram illustrating one embodiment of a test virtual volume 230. The test virtual volume 230 may be organized as one or more data structures on a memory and/or storage device 170. In the depicted embodiment, the test virtual volume 230 includes only the volume contents data 205. For example, the test virtual volume 230 may include only the VTOC 215. In addition, the test virtual volume 230 may also include the VTOC index 220 and/or the VVDS 225.

The test virtual volume 230 may not include the volume data 210. For example, the test virtual volume 230 may not include one or more data sets. Because the test virtual volume 230 does not include the volume data 210, numerous test virtual volumes 230 may be stored in the storage system 100 using only a small portion of storage space on the storage devices 170. As a result, operations may be tested on the storage system 100 for significantly reduced cost.

Figure 2D:
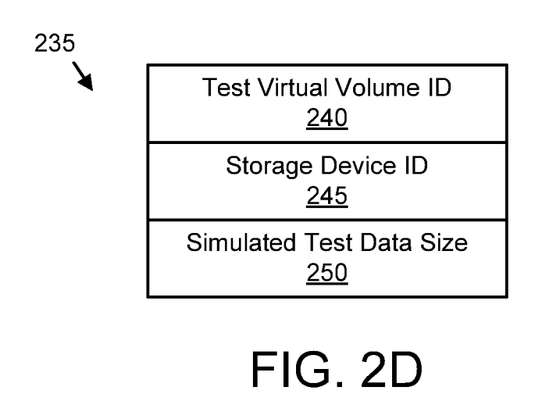
FIG. 2D is a schematic block diagram illustrating one embodiment of test virtual volume parameters.

FIG. 2D is a schematic block diagram illustrating one embodiment of test virtual volume parameters 235. The test virtual volume parameters 235 maybe organized as data structures in a memory and/or the storage devices 170. The test virtual volume parameters 235 may be used to create one or more test virtual volumes 230. In the depicted embodiment, the test virtual volume parameters 235 include a test virtual volume identifier 240, a storage device identifier 245, and a simulated test data size 250.

The test virtual volume identifier 240 may identify the test virtual volume 230. In one embodiment, the test virtual volume identifier 240 is a logical name. Alternatively, the test virtual volume identifier 240 may include a logical unit number.

The storage device identifier 245 may identify one or more storage devices 170 in the storage system 100. The test virtual volume 230 may be created on the storage devices 170 identified by the storage device identifier 245.

The simulated test data size 250 may specify the reported volume contents data size for the nonexistent virtual data of the test virtual volume 230. Thus, although the test virtual volume 230 stores no volume data 210, the test virtual volume 230 will report volume data 210 with a volume contents data size equal to the simulated test data size 250.

Figure 3A:
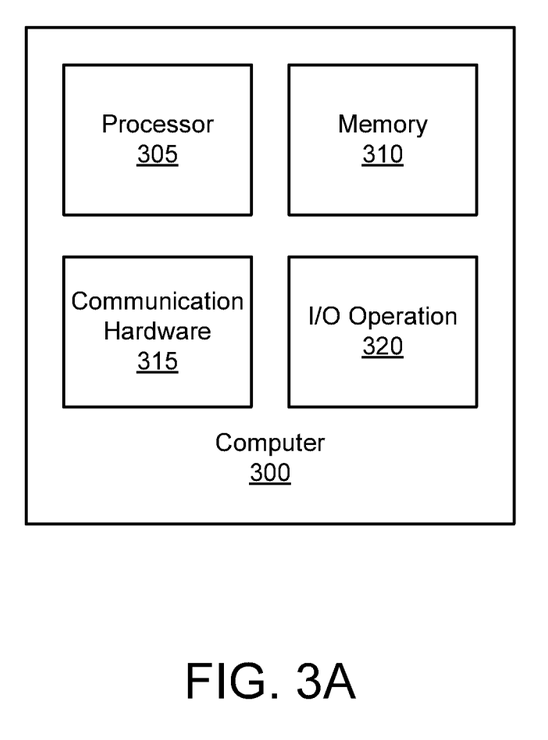
FIG. 3A is a schematic block diagram illustrating one embodiment of a computer.

FIG. 3A is a schematic block diagram illustrating one embodiment of a computer 300. The computer 300 may be embodied in the servers 130 and/or the storage controllers 160. The computer 300 may process an I/O operation. The computer 300 includes a processor 305, a memory 310, and communication hardware 315. The memory 310 may be a semiconductor storage device, a hard disk drive, an optical storage device, a micromechanical storage device, or combinations thereof. The memory 310 may store program code. The processor 305 may execute the program code. The communication hardware 315 may communicate with other devices.

The computer 300 may process the I/O operation 320. When directed to a production volume 200 stored in the storage devices 170, the I/O operation 320 may be executed. In addition, when the I/O operation 320 is directed to the volume contents data 205 of a test virtual volume 230, the I/O operation 320 may also be executed. However, when the I/O operation 320 is directed to the simulated data of the test virtual volume 230, the I/O operation 320 may be declined as will be described hereafter.

Figure 3B:
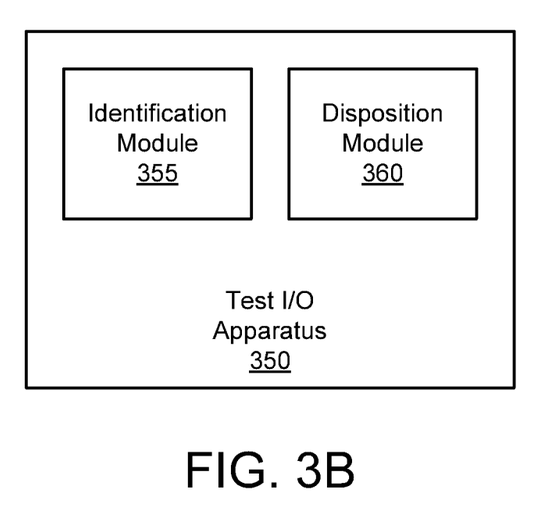
FIG. 3B is a schematic block diagram illustrating one embodiment of a test input/output (I/O) apparatus.

FIG. 3B is a schematic block diagram illustrating one embodiment of a test I/O apparatus 350. The apparatus 350 may support operation testing for the storage system 100. In the depicted embodiment, the apparatus 350 includes an identification module 355 and a disposition module 360. The identification module 355 and the disposition module 360 may be embodied in a computer readable storage medium such as the memory 310. The computer readable storage medium may store program code. The program code may be executed by the processor 305 to perform the functions of the identification module 355 and the disposition module 360. Alternatively, the identification module 355 and the disposition module 360 may comprise one or more of hardware and program code, the program code stored on one or more computer readable storage media.

The identification module 355 may determine if an I/O operation 320 for a test virtual volume 230 is directed to volume contents data 205. The disposition module 360 may execute the I/O operation 320 in response to the I/O operation 320 being directed to the volume contents data 205. In addition, the disposition module 360 may decline the I/O operation 320 in response to the I/O operation 320 not being directed to the volume contents data 205 as will be described hereafter.

Figure 4A:
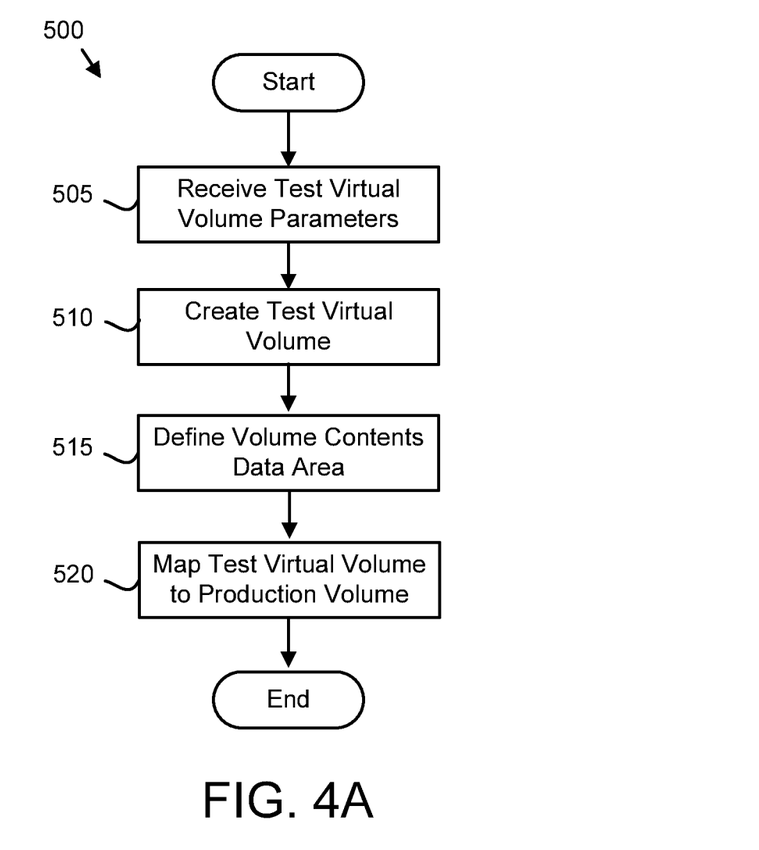
FIG. 4A is a schematic flow chart diagram illustrating one embodiment of a test virtual volume creation method.

FIG. 4A is a schematic flow chart diagram illustrating one embodiment of a test virtual volume creation method 500. The method 500 may be employed to create test virtual volumes 230. In one embodiment, the method 500 is performed repeatedly to create a plurality of test virtual volumes 230. The method 500 may be performed by the processor 305. Alternatively, the method 500 may be performed by a computer readable storage medium such as the memory 310. The computer readable storage medium may store program code executable by the processor 305 to perform the functions of the method 500.

The method 500 begins, and in one embodiment, the identification module 355 receives 505 the test virtual volume parameters 235. The test virtual volume parameters 235 may be received from the setup file, an administrator, a test file, or combinations thereof.

The identification module 355 may further create 510 a test virtual volume 230 on one or more storage devices 170 corresponding to the storage device identifier 245 of the test virtual volume parameters 235. In one embodiment, the identification module 355 allocates a sufficient data size for the volume contents data 205. In a certain embodiment, a production volume 200 may be created as the test virtual volume 230, with the test virtual volume 230 mapped to the production volume 200.

The identification module 355 may assign the test virtual volume identifier 240 of the test virtual volume parameters 235 to the created test virtual volume 230. For example, the test virtual volume 230 may be given the logical name from the test virtual volume identifier 240.

The identification module 355 may further define 515 a volume contents data size equal to the simulated test data size 350 for the test virtual volume 230. For example, if the simulated test data size 350 is 10 gigabytes, the volume contents data size may be defined 515 as 10 gigabytes. In addition, when the volume contents data 205 is interrogated for the volume contents data size, 10 gigabytes will be reported as a volume contents data size. However, the test virtual volume 230 will have no volume data 210.

The identification module 355 may map 520 the newly created test virtual volume 230 to a production volume 200 and the method 500 ends. In one embodiment, the production volume 200 has no volume data 210. The test virtual volume 230 may be mapped 520 to the production volume 200 through a logical association.

Figure 4B:
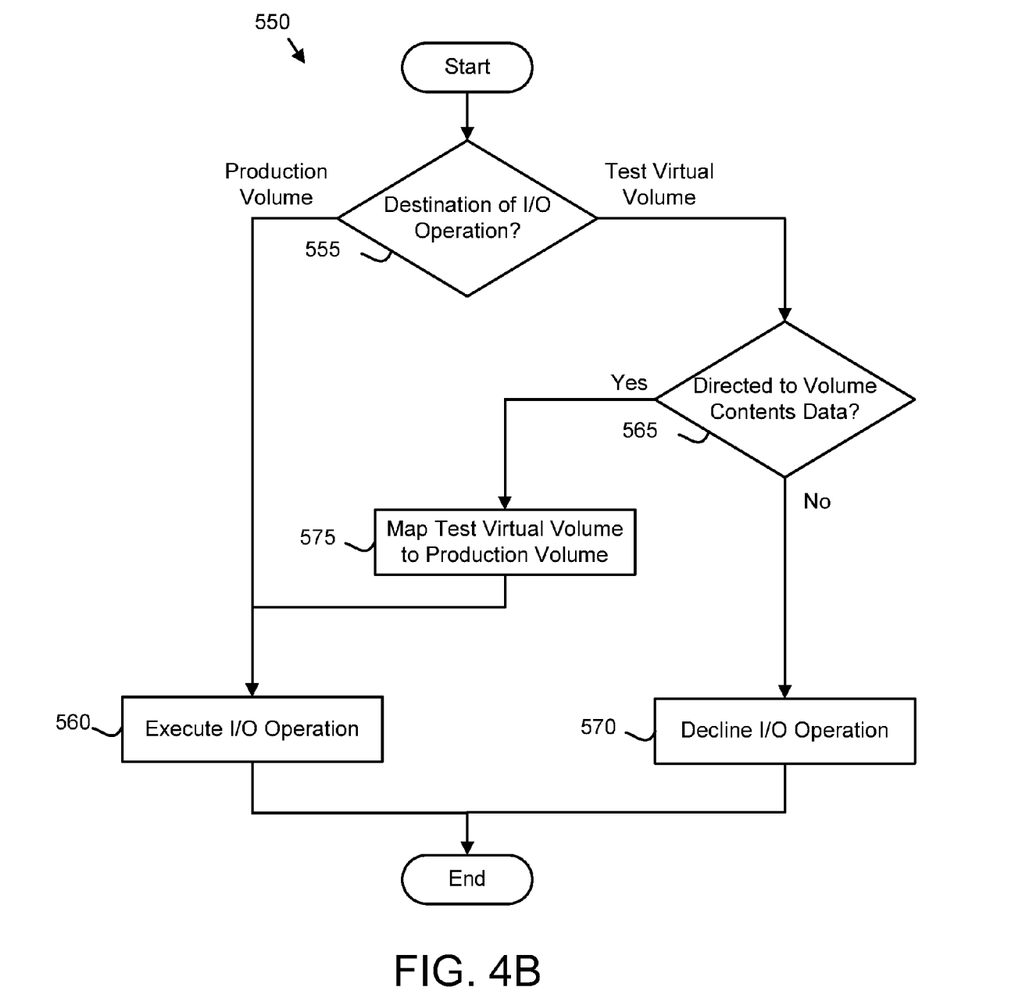
FIG. 4B is a schematic flow chart diagram illustrating one embodiment of an operation testing method.

FIG. 4B is a schematic flow chart diagram illustrating one embodiment of an operation testing method 550. The method 550 may handle I/O operations 320 for the storage system 100 including I/O operations 320 that are directed to the test virtual volume 230. The method 550 may be performed by the processor 305. Alternatively, the method 550 may be performed by a computer readable storage medium such as the memory 310. The computer readable storage medium may store program code executable by the processor 305 to perform the functions of the method 550.

The method 550 starts, and in one embodiment, the identification module 355 determines 555 the destination of an I/O operation 320. If the I/O operation 320 is destined for a production volume 200, the disposition module 360 executes 560 the I/O operation 320 and the method 550 ends. The disposition module 360 may execute 560 the I/O operation 320 by performing the I/O operation 320 on a storage device 170. For example, a write I/O operation 320 may be executed by writing data from the write I/O operation 320 to a storage device 170 corresponding to the production volume 200. Both volume contents data 205 and volume data 210 may be written to, read from, and/o deleted from the production volume 200.

However, if the I/O operation 320 is destined for a test virtual volume 230, the identification module 355 determines 565 if the I/O operation 320 is directed to volume contents data 205 of the test virtual volume 230. If the I/O operation 320 is directed to the volume contents data 205 of the test virtual volume 230, the disposition module 360 may map 575 the test virtual volume 230 to a corresponding production volume 200. In addition, the disposition module 360 may execute 560 the I/O operation 320 in response to the I/O operation 320 being directed to the volume contents data 205 and the method 550 ends.

If the I/O operation 320 is not directed to the volume contents data 205 of the test virtual volume 230, such as when the I/O operation 320 is directed to volume data 210 for the test virtual volume 230, the disposition module 360 declines 570 the I/O operation 320 in response to the I/O operation 320 not being directed to the volume contents data 205 and the method 550 ends. The declining of the I/O operation will be described in hereafter in greater detail in FIG. 4C.

Figure 4C:
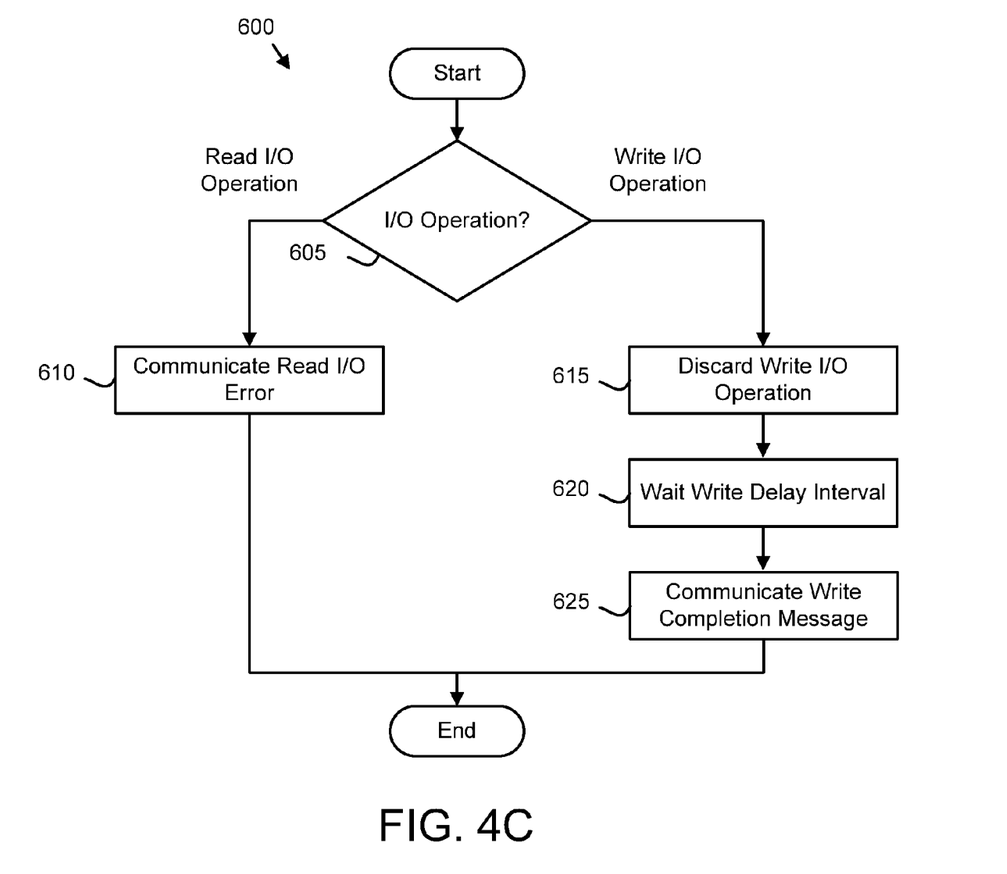
FIG. 4C is a schematic flow chart diagram illustrating one embodiment of a declining I/O method.

FIG. 4C is a schematic flow chart diagram illustrating one embodiment of a declining I/O method 600. The method 600 declines the I/O operation 320 if the I/O operation 320 is directed to the volume data 210 of the test virtual volume 230, such as for step 570 of FIG. 4B. The method 600 may be performed by the processor 305. Alternatively, the method 600 may be performed by a computer readable storage medium such as the memory 310. The computer readable storage medium may store program code executable by the processor 305 to perform the functions of the method 600.

The method 600 starts, and in one embodiment, the identification module 355 determines 605 whether the I/O operation 320 is a write I/O operation 320 or read I/O operation 320. If the I/O operation 320 is a read I/O operation 320, the disposition module 360 may communicate 610 a read I/O error to an operating system of the storage system 100 and the method 600 ends. In addition, the disposition module 360 may communicate 610 the read I/O error to a client 110.

In an alternate embodiment, the disposition module 360 communicates 610 simulated data in place of the read I/O error. For example, the disposition module 360 may communicate a predefined data set of dummy data in place of the read I/O error. The dummy data may be communicated to a client 110 and a read completion message may be sent to the operating system.

If the I/O operation 320 is a write I/O operation 320, the disposition module 360 may discard 615 the write I/O operation 320. In one embodiment, the disposition module 360 discards 615 the write I/O operation by removing the write I/O operation 320 from an I/O operation queue without executing the write I/O operation 320.

In one embodiment, the disposition module 360 further waits 620 a write delay interval. The write delay interval may be equivalent to a time interval required to write data to a storage device 170. In one embodiment, the write delay interval is equivalent to a minimum time interval required to write data to the storage device 170. Alternatively, the write delay interval may be equivalent to a maximum time interval required to write data to the storage device 170. In a certain embodiment, the write delay interval is a randomly selected time interval between the minimum time interval and the maximum time interval required to write data to the storage device 170. By waiting 620 the write delay interval, the disposition module 360 simulates executing the write I/O operation 320.

The disposition module 360 may further communicate 625 a write completion message and the method 600 ends. In one embodiment, the disposition module 360 communicate 625 a write completion message to the operating system for the storage system 100. Alternatively, the disposition module 360 may communicate 625 the write completion message to the client 110 that initiated the I/O operation 320. By communicating 625 the write completion message, the disposition module 360 simulates executing the I/O operation 320.

The embodiments create the test virtual volume 230 in the test environment and handle I/O operations 320 directed to the test virtual volume 230. If the I/O operation 320 is directed to the volume contents data 205 of the test virtual volume 230, the I/O operation 320 is executed. However, if the I/O operation 320 is directed to the volume data 210 of the test virtual volume 230 the I/O operation 320 is declined. In addition, I/O operations 320 that are directed to production volumes 200 are executed. As a result, test operations can be performed on a large number of test virtual volumes 230 instead of creating and using more expensive production volumes 200.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for operation testing comprising:
determining, by use of a processor, if an input/output (I/O) operation for a test virtual volume is directed to volume contents data of the test virtual volume;
in response to the I/O operation being directed to the volume contents data, determining whether the I/O operation is a write operation or a read operation;
in response to determining the I/O operation directed to the volume contents data being the write operation, discarding the write I/O operation, waiting a delay write interval, and communicating a write completion message;
in response to determining the I/O operation directed to the volume contents data being the read operation, declining the read I/O operation and communicating a read I/O error; and
declining the I/O operation in response to the I/O operation not being directed to the volume contents data.

2. The method of claim 1, wherein the volume contents data comprises at least one of a volume table of contents (VTOC), a VTOC Index, and a virtual storage access method (VSAM) volume data set (VVDS).

3. The method of claim 1, the method further comprising:
determining a destination of the I/O operation;
executing the I/O operation in response to the I/O operation being for a production volume; and determining if the I/O operation is directed to the volume contents data in response to the I/O operation being for the test virtual volume.

4. The method of claim 3, the method further comprising mapping the test virtual volume to a production volume.

5. The method of claim 1, the method further comprising:
receiving test virtual volume parameters for the test virtual volume, the test virtual volume parameters comprising a test virtual volume identifier, a storage device identifier, and a simulated test data size;
creating the test virtual volume on a storage device corresponding to the storage device identifier;
defining a volume contents data size of the simulated test data size; and
mapping the test virtual volume to a production volume.

6. An apparatus comprising:
a processor;
a memory that stores code executable by the processor to:
determine if an input/output (I/O) operation for a test virtual volume is directed to volume contents data of the test virtual volume;
in response to the I/O operation being directed to the volume contents data, determine whether the I/O operation is a write operation or a read operation;
in response to determining the I/O operation directed to the volume contents data being the write operation, discard the write I/O operation, waiting a delay write interval, and communicating a write completion message;
in response to determining the I/O operation directed to the volume contents data being the read operation, decline the read I/O operation and communicating a read I/O error; and
declining the I/O operation in response to the I/O operation not being directed to the volume contents data.

7. The apparatus of claim 6, wherein the volume contents data comprises at least one of a volume table of contents (VTOC), a VTOC Index, and a virtual storage access method (VSAM) volume data set (VVDS).

8. The apparatus of claim 6, wherein the processor further:
determines a destination of the I/O operation;
executes the I/O operation in response to the I/O operation being for a production volume; and
determines if the I/O operation is directed to the volume contents data in response to the I/O operation being for the test virtual volume.

9. A computer program product for operation testing, the computer program product comprising a computer readable storage medium having program code embodied therewith, the program code readable/executable by a processor to cause the processor to:

determine if an input/output (I/O) operation for the test virtual volume is directed to volume contents data of the test virtual volume;

in response to the I/O operation being directed to the volume contents data, determining whether the I/O operation is a write operation or a read operation;

in response to determining the I/O operation directed to the volume contents data being the write operation, discarding the write I/O operation, waiting a delay write interval, and communicating a write completion message;

in response to determining the I/O operation directed to the volume contents data being the read operation, declining the read I/O operation and communicating a read I/O error; and decline the I/O operation in response to the I/O operation not being directed to the volume contents data.

10. The computer program product of claim 9, wherein the volume contents data comprises at least one of a volume table of contents (VTOC), a VTOC Index, and a virtual storage access method (VSAM) volume data set (VVDS).

11. The computer program product of claim 9, the program code further causing the processor to:

determine a destination of the I/O operation;

execute the I/O operation in response to the I/O operation being for a production volume; and determine if the I/O operation is directed to the volume contents data in response to the I/O operation being for the test virtual volume.

\* \* \* \* \*